UNITED STATES PATENT OFFICE.

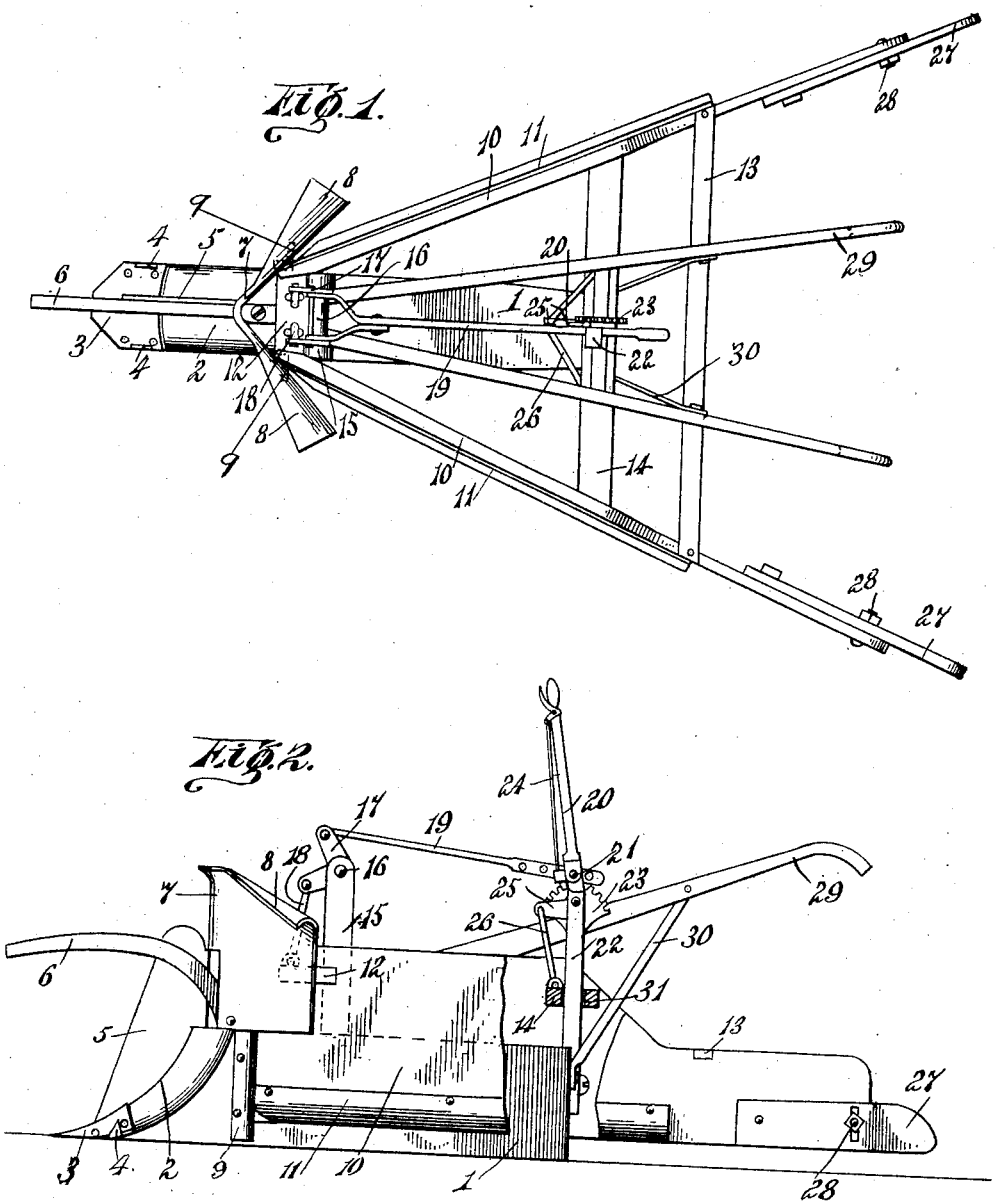

ROSARIO CARDINAL, OF ST. PHILIPPE DE LAPRAIRIE, QUEBEC, CANADA.

DITCHING AND GRADING PLOW.

No. 832,839.      Specification of Letters Patent.      Patented Oct. 9, 1906.

Application filed June 25, 1906. Serial No. 323,232.

*To all whom it may concern:*

Be it known that I, ROSARIO CARDINAL, a subject of the King of Great Britain, residing at St. Philippe de Laprairie, county of Laprairie, in the Province of Quebec, Canada, have invented certain new and useful Improvements in Ditching and Grading Plows; and I do hereby declare that the following is a full, clear, and exact description of the invention, such as will enable others skilled in the art to which it appertains to make and use the same.

My invention relates to plows.

The object of my invention is to provide a ditching and grading plow which will cut a ditch and throw the soil evenly on both sides.

A further object is to provide such a plow with adjustable grading members on each side.

A further object is to provide means for evenly distributing the soil on both sides of the implement.

A further object is to provide a removable point with cutting-blades to cut the vertical sides of a ditch; and my invention consists of the construction, combination, and arrangement of parts as herein illustrated, described, and claimed.

In the accompanying drawings, forming part of this application, I have illustrated one form of embodiment of my invention, in which drawings similar reference characters designate corresponding parts, and in which—

Figure 1 is a plan view, and Fig. 2 is a side elevation partly broken away.

Referring to the drawings, 1 designates a central solid beam adapted to bear upon the ground and form a support for the implement.

As best shown in Fig. 2, the forward end 2 of the beam is upwardly curved and backwardly inclined. Removably disposed on the extreme forward end of the beam 1 is a cutting-point 3, having the vertical side cutting members 4. Disposed on the forward end of the beam 1 is a vertical cutting-blade 5, adapted to evenly divide the soil, so that equal portions will fall to the opposite sides of the implement. A suitable draft-attaching member 6 may be secured to the beam 1.

To prevent the cut soil from passing to the upper face of the beam 1 and clogging the other parts of the apparatus, a pointed deflecting-shield 7 is secured to the beam 1 and provided with downturned inclined upper flanges 8.

Secured adjacent the forward end of the beam 1, on opposite sides thereof, are guards 9, between which and the sides of the beam 1 are slidably disposed the grading-wings 10, provided with cutting members 11 adjacent their lower edges. The shields 9 serve to cover the forward ends of the wings 10, so that the soil is thrown outward into the path of movement of said wings, which are arranged to diverge toward the rear portion of the implement. The wings 10 are connected by a forward bar 12, a rear bar 13, and a bar 14 intermediate of the bars 12 and 13, so that they are rigidly held with relation to each other.

Secured to the beam 1 are standards 15, on the upper end of which is disposed a shaft 16. Rockably disposed on the shaft 16 are bell-crank levers 17, connected by links 18 to the cross-bar 12 and connected by the bifurcated link 19 to a lever 20, which is pivoted, as at 21, to a bifurcated standard 22, secured to the rear end of the beam 1. A segmental rack 23 is disposed adjacent the lever 20 and is adapted to be engaged by the pawl 24 on said lever. A bell-crank lever 25 is secured to the lever 20 and connected by a link 26 to the intermediate cross-bar 14. By this arrangement the wings 10 may be raised vertically and locked in any desired position by means of the pawl and segmental rack.

For the purpose of forming the proper grade at the outer end of the wings 10 are pivoted the grading-wings 27, adapted to be set in any desired position by means of the set-screws 28.

Secured to the beam 1 are handles 29, extending rearwardly past the rear end of the beam and secured thereto by means of the braces 30. To permit the cross-bar 14 to move vertically over the standard 22, a suitable opening 31 is provided, through which the standard 22 works.

Having thus fully described my invention, what I claim as new, and desire to secure by Letters Patent, is—

1. In a plow, a central beam having an upwardly-curved front end having backwardly-inclined sides, draft-attaching means on the beam, a point on the beam, means for dividing the soil raised by the point, guards on the beam, wings connected with the beam, means for raising and lowering the wings, and adjustable grading members carried by the wings.

2. In a plow, a central beam having an upwardly-curved front end having backwardly-inclined sides, draft-attaching means on the beam, a removable point on the beam provided with vertical cutting-blades, means for dividing the soil raised by the point, a shield on the beam, wings connecting with the beam, means for raising and lowering the wings, and adjustable grading members carried by the wings.

3. In a plow, a central beam having an upwardly-curved front end provided with rearwardly-inclined sides, draft-attaching means secured to the beam, a point on the beam, a vertical dividing-plate secured to the front end of the beam, a shield on the beam, wings connected with the beam, means for raising and lowering the wings, and adjustable grading members carried by wings.

4. In a plow, a central beam having an upwardly-curved front end and backwardly-inclined sides, draft-attaching means on the beam, a point on the beam, means for dividing the soil raised by the point, a vertical shield disposed adjacent the front end of the beam and provided with downwardly-inclined flanges, wings connecting with the beam, means for raising and lowering the wings, and adjustable grading members carried by the wings.

5. In a plow, a central beam having an upwardly-curved front end having backwardly-inclined sides, draft-attaching means on the beam, a point on the beam, means for dividing the soil raised by the point, guards on the beam, wings connected with the beam, vertical shields secured to the beam and arranged to cover the forward ends of the wings, means for raising and lowering the wings, and adjustable grading members carried by the wings.

6. In a plow, a central beam having an upwardly-curved front end having backwardly-inclined sides, draft-attaching means on the beam, a point on the beam, means for dividing the soil raised by the point, guards on the beam, wings connected with the beam, standards on the beam, bell-crank levers supported by the standards, links connecting the wings and the bell-crank levers, means for rocking the levers, and grading members carried by the wings.

7. In a plow, a central beam having an upwardly-curved front end having backwardly-inclined sides, draft-attaching means on the beam, a point on the beam, means for dividing the soil raised by the point, guards on the beam, wings connected with the beam, cross-pieces connecting the wings, standards on the beams, bell-crank levers pivotally supported on the standards, links connecting the cross-pieces and the bell-crank levers, a lever connected to one of the bell-crank levers, a link connecting the other bell-crank levers and said lever, a segmental rack, a pawl on said lever adjacent the rack, and adjustable grading members carried by the wings.

8. In a plow, a central beam having an upwardly-curved front end provided with backwardly-inclined sides, draft-attaching means on the beam, a removable point on the beam, means for dividing the soil raised by the point, a shield on the beam, wings connected with the beam, means for raising and lowering the wings, adjustable grading members pivoted to the outer ends of the wings, and set-screws adapted to lock the grading members.

In witness whereof I have hereunto set my hand in the presence of two witnesses.

ROSARIO CARDINAL.

Witnesses:
T. MYNARD,
JOS. J. B. CHARBONNEAU.